Sept. 13, 1932.  G. A. JOHNSON  1,877,329
FRICTION SHOCK ABSORBING MECHANISM
Filed April 16, 1930  2 Sheets-Sheet 2
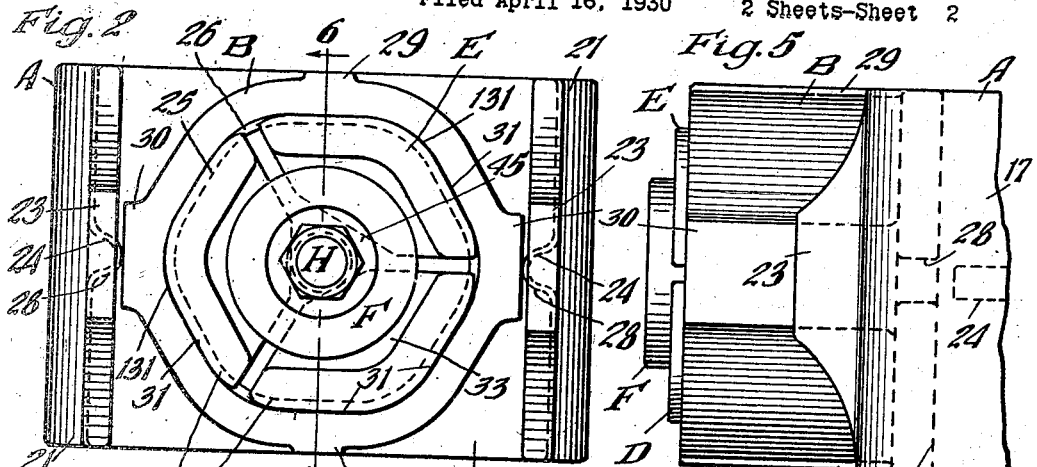
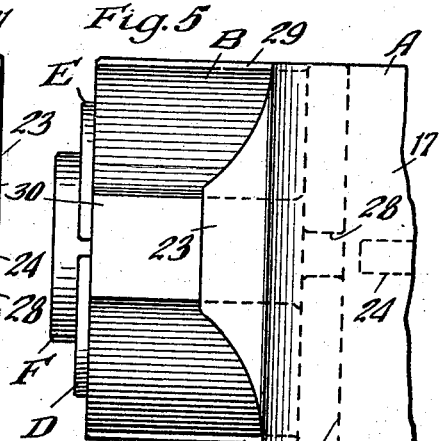
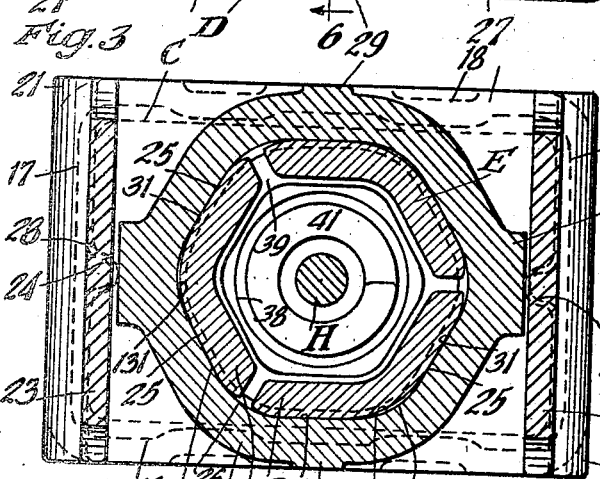
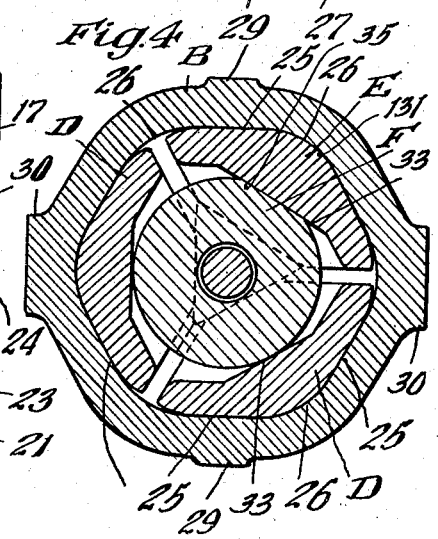
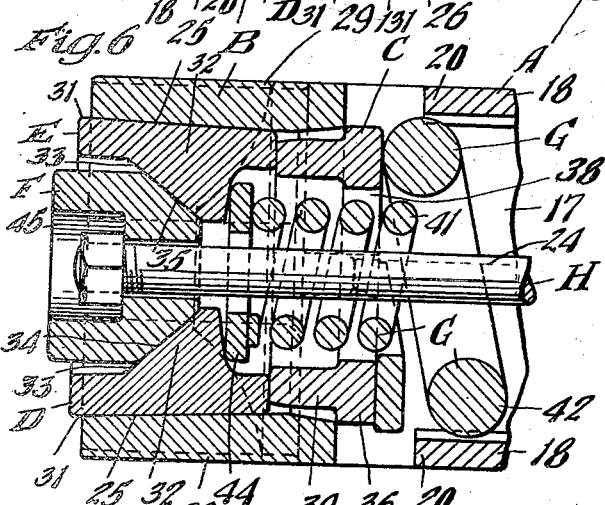
Inventor
George A. Johnson
By Joseph Harris
His Atty.
Witness
Wm. Geiger Patented Sept. 13, 1932

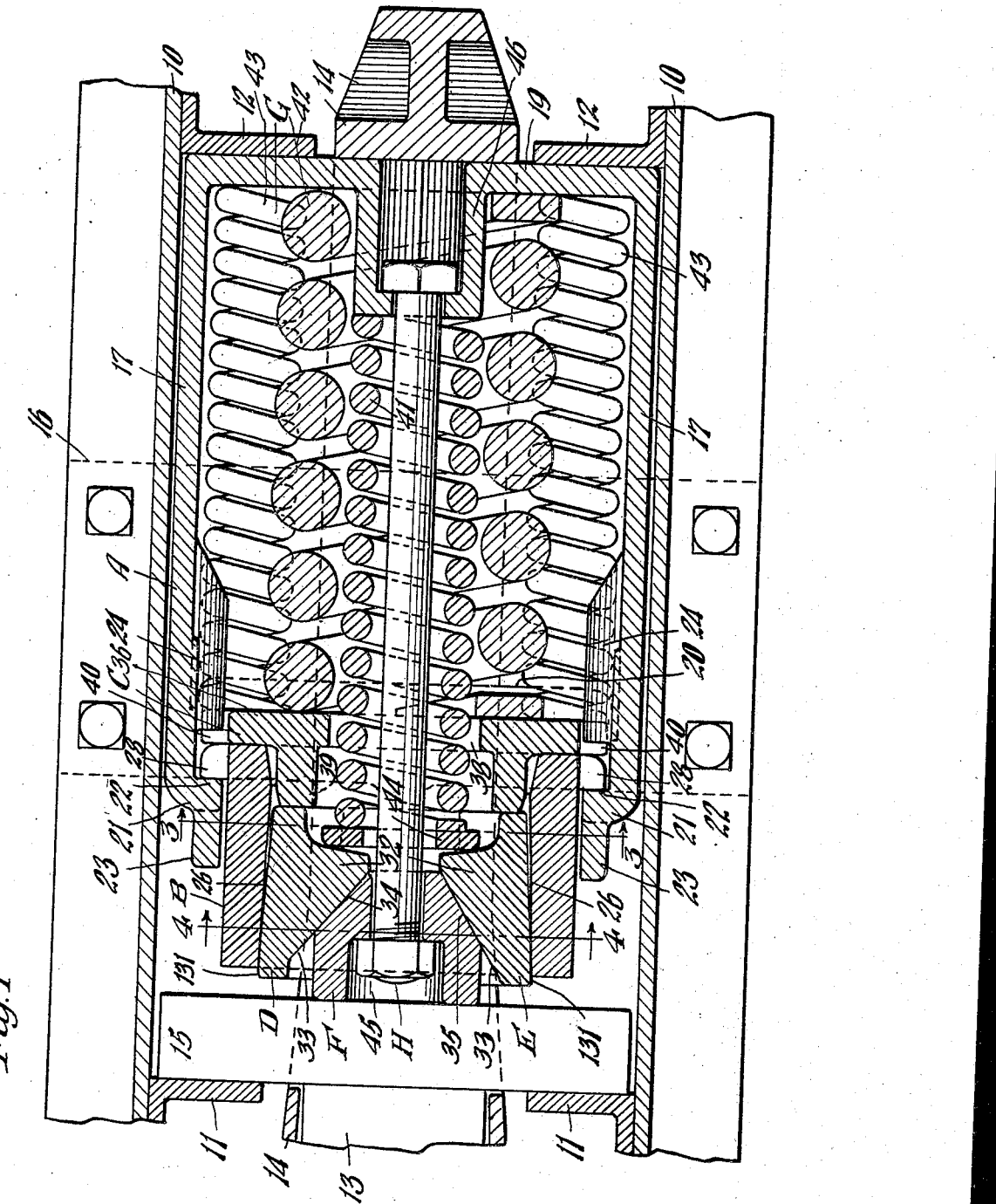

1,877,329

UNITED STATES PATENT OFFICE

GEORGE A. JOHNSON, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed April 16, 1930. Serial No. 444,674.

This invention relates to improvements in friction shock absorbing mechanisms especially adapted for railway draft riggings.

One object of the invention is to provide a friction shock absorbing mechanism affording free spring action during the first part of the compression stroke followed by high combined frictional and spring resistance produced by means including a friction shell and spring cage, which are relatively movable with respect to each other to an extent less than the full compression stroke of the mechanism, and spring resistance means opposing said relative movement to provide for the free spring action, and wherein the high frictional resistance is produced by a plurality of friction shoes cooperating with the friction shell and wedge means for creating pressure between the shoes and shell, the shell having longitudinally disposed interior friction surfaces arranged about the axis thereof with which the shoes engage, the cooperating surfaces of the shell and shoes being so designed as to guide the shoes lengthwise of the mechanism and hold the same against circumferential displacement with respect to the shell.

Another object of the invention is to provide a friction shock absorbing mechanism as specified in the preceding paragraph, wherein the wedge has wedging engagement with the shoes along faces so arranged as to provide an equalized, radially, outwardly directed wedging action and the shell is of hexagonal interior cross section, presenting a plurality of flat, interior friction surfaces converging inwardly of the shell, and the cooperating shoes are three in number, each shoe having a V-shaped friction surface cooperating with two adjacent shell surfaces, whereby uniform distribution of the stresses in the shell is had with resultant maximum capacity and strength to resist bursting strains for a shell of given size and thickness is obtained, and wherein a spring follower is interposed between the spring resistance and the friction shell and has an enlargement cooperating with the shoes on which the inner ends of the shoes bear, the enlargement being designed to present abutment surface areas giving full bearing support for the inner ends of the V-shaped shoes in all operative positions thereof.

Yet another object of the invention is to provide in a friction shock absorbing mechanism of the character indicated including a relatively movable friction shell and spring cage, a spring follower within the cage, the shell and cage being provided with interengaging flanges limiting outward movement of the shell and holding the same assembled with the cage, the shell and spring follower being locked against relative rotation by forming a shell of interior, polygonal cross section and providing the spring follower with a polygonal enlargement or flange section engaging and fitting within the inner end of the shell.

A still further object of the invention is to provide a mechanism of the character indicated in the preceding paragraph wherein the retaining flange portion of the shell is assembled with the cooperating retaining shoulders of the cage by lateral displacement of the shell and cage relatively toward each other, and wherein the parts are at all times, in all operative positions thereof, held interlocked through the medium of the spring follower, after being assembled, by telescoping of the flange of the spring follower within the inner end of the shell.

Other objects of the invention will more clearly appear from the description and claims hereinafter following.

In the drawings, forming a part of this specification, Figure 1 is a horizontal, longitudinal, sectional view through the underframe structure of a railway car, illustrating my improvements therewith, the section through the friction shell member being on two planes at an angle to each other. Figure 2 is a front, elevational view of the shock absorbing mechanism proper illustrated in Figure 1. Figures 3 and 4 are transverse, sectional views corresponding respectively to the lines 3—3 and 4—4 of Figure 1. Figure 5 is a side elevational view of the front end portion of the spring cage and the friction shell of my improved shock absorbing mechanism. And Figure 6 is a longitudinal, vertical, sectional view of the front end portion of the spring cage, together with the friction shell, corresponding substantially to the line 6—6 of Figure 2.

In said drawings, 10—10 indicates spaced channel-shaped center sills of the railway car underframe, to the inner sides of which are secured the usual front stop lugs 11—11 and rear stop lugs 12—12. The inner end part of the coupler shank of the railway car is designated by 13 and a hooded yoke 14 is operatively connected thereto. My improved shock absorbing mechanism and a front main follower 15 are disposed within the yoke, and the yoke in turn is supported by the usual detachable saddle plate 16 secured to the bottom flanges of the draft sills 10.

In carrying out my invention, I provide broadly a spring cage casting A; a friction shell member B; a spring follower C; a plurality of friction shoes D—D and E; a wedge block F; a main spring resistance G and a retainer bolt H.

The spring cage casting A is of substantially rectangular box-like form having spaced, longitudinally extending vertical side walls 17—17, horizontally disposed spaced top and bottom walls 18—18 and a vertical rear end wall 19. The end wall 19 cooperates with the stop lugs 12 in the manner of the usual rear follower. As most clearly illustrated in Figure 6, the side walls 17—17 of the casting A extend an appreciable distance forwardly of the front end portions of the top and bottom walls 18—18, the front end portions of the latter, which are indicated by 20—20, serving as transverse abutment shoulders for a purpose hereinafter pointed out. Forwardly of the abutment shoulders 20—20, the side walls 17—17 are provided with inturned sections 21—21 presenting vertically disposed retaining shoulders 22—22 spaced forwardly from the abutment shoulders 20—20, hereinbefore referred to. Outwardly beyond the inturned sections 21—21, the side walls have extensions 23—23 which embrace the sides of the friction shell member B and form guide means for the same. As most clearly illustrated in Figure 5, the guide sections 23 are cut away at the top and bottom sides along curved lines, thereby presenting a forwardly projecting wing or arm of the formation shown in Figure 5. Each side wall 17 is also provided with an interior, longitudinally extending guide rib 24 which is disposed inwardly of the plane of the abutment shoulders 20—20 of the spring cage and extends rearwardly thereof, as clearly shown in Figure 1. The guide ribs 24—24 of the two walls 17 are in transverse alinement and cooperate with the spring follower C in a manner hereinafter pointed out to guide the same in its movement inwardly of the spring cage. As will be evident, the top and bottom walls 18—18 of the spring cage being shorter than the side walls, the top and bottom sides of the cage at the forward end are provided with transverse openings to permit entrance of the flanges of the spring follower and friction shell, as hereinafter pointed out, in order to facilitate the assembling of the mechanism.

The friction shell B is of substantially regular hexagonal form, as most clearly shown in Figures 2, 3 and 4. The six wall sections are arranged uniformly about the longitudinal axis of the mechanism. As most clearly shown in Figures 2, 3 and 4, the top and bottom wall sections of the shell are disposed horizontally and the sections forming the side walls comprise top sections which are inclined downwardly and outwarly, and bottom sections which are inclined downwardly and inwardly. The wall sections of the hexagonal shell present six, longitudinally disposed flat interior friction surfaces 25—25, which are arranged symmetrically about the longitudinal axis of the mechanism and converge slightly inwardly. At the intersection of each adjacent pair of friction surfaces 25—25, the interior surface of the friction shell is curved, or rounded, as clearly shown in Figures 2, 3 and 4, as indicated at 26. Each curved surface section 26 is of uniformly varying radius from the outer end of the shell inwardly, being of greatest radius at the forward end and of smallest radius at the rear end of the shell, as clearly shown in Figures 4 and 3 respectively. As will be evident, each pair of adjacent friction surfaces 25—25, together form a V-shaped friction surface section with which a friction shoe cooperates, as hereinafter clearly pointed out. At the inner end, the shell B is provided with a pair of laterally projecting flange members 27—27 which are located between the abutment shoulders 20 and the retaining shoulders 21 of the spring cage and are adapted to engage the retaining shoulders to limit the outward movement of the shell. Midway between the top and bottom portions, the flange members 27—27 are notched or cut away, as indicated at 28—28 to cooperate with the guide ribs 24—24 of the spring cage. The top and bottom wall members of the shell are reinforced by relatively shallow, longitudinally extending ribs 29—29, which are adapted to cooperate with the top and bottom arms of the yoke member 14. The opposite sides of the shell B are also reinforced by exterior, longitudinally extending, relatively wide rib members 30—30, which are embraced by the guides 23—23 of the spring cage and are guided therebetween to prevent rocking or tilting of the friction shell.

The friction shoes, which are three in number and are indicated by D—D and E, are arranged symmetrically about the axis of the mechanism, each shoe having a V-shaped outer friction surface 31 cooperating with a pair of adjacent friction surfaces 25—25 of the friction shell. The friction shoes D—D and E are all of like design, except as hereinafter pointed out. On the inner side each shoe is provided with an enlargement 32 having a wedge face 33 cooperating with the wedge block F. The wedge faces of the shoes D—D are disposed at relatively blunt angles with respect to the longitudinal axis of the mechanism, while the wedge face of the shoe E is disposed at a relatively keen angle with respect to said axis. The V-shaped friction surface 31 of each shoe has the two angularly disposed sections thereof arranged to fit and properly engage the cooperating friction surfaces 25—25 of the shell. The two sections of the friction surface of each shoe are connected by a curved portion 131 at their intersection, which is uniform from front to rear of the shoe and corresponds to the curvature of greatest radius of the curved surface 26, which connects the corresponding friction surface 25—25.

The wedge block F bears at its forward end on the inner side of the main follower 15, the latter cooperating with the front stop lugs 11 in the usual manner. At the inner end, the wedge block F has three wedge faces 34—34 and 35 arranged symmetrically about the axis of said block, the wedge faces 34—34 being disposed at relatively blunt angles while the wedge face 35 is disposed at a relatively keen angle. The wedge faces 34—34 cooperate with the wedge faces 33—33 of the shoes D, while the wedge face 35 cooperates with the keen wedge face 33 of the shoe E.

The spring follower C, which is interposed between the inner end of the friction shell B and the main spring resistance G, comprises a main body portion 36 which is in the form of a substantially rectangular plate-like member, and is provided with a central opening 38 for a purpose hereinafter pointed out. The plate section of the spring follower C normally bears directly on the inner end of the friction shell. At the forward side, the spring follower is provided with a projecting flange member 39, which surrounds the opening 38 and is of substantially hexagonal outline so as to interfit with the interior of the friction shell B. As most clearly shown in Figures 1 and 6, the flange 39 protrudes to a considerable extent and extends into the friction shell such a distance as to engage the inner ends of the friction shoes D—D and E. The amount of projection of the flange portion 39 is preferably such as to exceed the amount of relative movement of the friction shoes and shell B, so that the hexagonal flange member will at no time during the operation of the friction shock absorbing mechanism be disengaged from said shell. As will be evident due to the hexagonal formation of the projection or flange 39 of the spring follower and the corresponding interior section of the friction shell, these two parts interfit and lock together so as to prevent relative rotation of the same. The opposite vertical sides of the plate section 36 of the spring follower C are centrally notched or recessed, as indicated at 40—40, to cooperate with the guide ribs 24—24 of the spring cage. The height of the spring follower C is such that the same will fit between the top and bottom walls 18—18 of the spring cage and move freely inwardly of the cage.

The main spring resistance G comprises a pair of central spring members 41 and 42 and four additional coil spring members 43—43 spaced about said central members. The central member 41 is disposed within the member 42 and comprises a relatively light coil having its inner end bearing on an inwardly extending hollow boss 46 formed on the end wall 19 of the spring cage. The forward end of the coil 41 extends freely through the openings 38 of the spring follower and engages a spring follower disc 44 bearing on the enlargements 32 of the friction shoes. The spring 42, which surrounds the spring 41, is of relatively heavy construction and has the forward end thereof bearing on the spring follower C. The rear end portion of the spring 42 surrounds the boss 46 and bears directly on the end wall 19 of the spring cage. The four outer coils 43—43 of the spring resistance G are disposed in the four corners of the spring cage and have their opposite ends bearing respectively on the spring follower C and the end wall 19 of the spring cage.

The mechanism is held assembled and of uniform over-all length by the retainer bolt H, which has its opposite ends anchored respectively to the wedge block F and the hollow boss 46 of the rear end wall 19 of the spring cage, the head of the bolt being disposed within said hollow boss and the shank thereof extending through the inner coil 41 of the spring resistance, alined openings in the hollow boss, spring follower disc 44 and wedge block F. The nut of the retainer bolt is disposed within a pocket or recess 45 provided in the wedge block F.

When the mechanism is assembled, the retainer bolt holds the spring resistance, including the coil 41, under a certain amount of initial compression. As will be evident, the spring 41 extending through the spring follower C and directly cooperating with the friction shoes compensates for wear of the various friction and wedge faces of the mechanism, inasmuch as the tendency of this spring to expand maintains the shoes projected outwardly, while the retainer bolt limits the outward movement of the wedge block.

In assembling the parts of my improved shock absorbing mechanism, the four outer coils of the spring resistance G are first inserted within the spring cage and placed in position in the corners thereof, the heavier coil 42 being then inserted therebetween. The spring follower is next assembled with the shell by passing the plate-like section thereof into the space between the abutment faces 20 and the retaining shoulders 22 of the spring cage. After the main portion of the spring follower has been brought into alinement between the top and bottom walls 18—18 of the spring cage, the same is forced inwardly and the springs 42 and 43 compressed, until the forward end portion of the projection or flange 39 of the spring follower clears the retaining shoulders 22—22 to such an extent as to permit insertion of the retaining flange portions 27—27 of the friction shell between the forward side of the plate-like portion of the spring follower and said shoulders. The friction shell is then assembled with the spring cage by passing the flange members 27—27 thereof into the opening between the shoulders 20 and 22, engaging the flanges 27 in back of said shoulders 22. When the shell has been brought into substantial axial alinement with the spring cage, the flange 39 of the spring follower will be alined with the interior of the shell so that the parts will be telescoped when the pressure on the spring follower is relieved. As will be evident, upon outward movement of the spring follower the same engages within the inner end of the friction shell and prevents vertical lateral displacement of the same with respect to the spring cage, thereby holding the same positively assembled therewith.

Two very important considerations in friction gears are the prevention of circumferential shift of the shoes and the maintenance of full area contact between the friction faces under all conditions of operation. With my improved construction, due to the angular arrangement of the flat friction faces of the shell and each shoe, respectively, a combined friction surface is formed, which absolutely prevents any circumferential shift of the shoes. In this connection, it will be noted also that the three shoe arrangement in conjunction with the three-faced wedge, insures equalized radially outwardly directed forces on the three shoes and also that each shoe, in effect, has a wedging action against the friction shell. This last mentioned wedging action of the shoes laterally against the shell further serves to positively insure uniform stresses in the shell, since it will be apparent that each diametrically opposite and parallel set of sections of the shell will be pressed apart and thus prevent distortion of the shell and any excessive stress in any particular section of the shell.

With reference to the maintenance of the full area contact between the friction surfaces of the shoes and shell, it will be observed that this is maintained on the converged friction surfaces in any position of the shoes with respect to the shell. Due to the fact that initially there is only line contact between the curved faces 26 and 131 at the outer ends of the former, as the shoes travel inwardly the curved faces 131 thereof will gradually slightly space themselves from the shell surfaces 26 so that there is no possibility of the shoes being lifted off from the flat friction surfaces of the shell and hence there will always be full area contact between the two pairs of flat friction faces of the shoes and shell respectively. During the inward movement of the shoes and due to the slight spacing initially occurring at the curved faces above mentioned, it is evident that there will be an equally distributed pressure radially outwardly against both flat sections of each shoe and this will remain true, notwithstanding the tapered or converged formation of the friction shell surfaces.

It is further pointed out that due to the formation of the curved surfaces of the shoes and shell, as the shoes are moved inwardly of the tapered shell, there is no danger of the edges of the shoes gouging into or abrading the shell surface at the corners, which if not prevented, might start a line of scoring which would so weaken the shell that the outward pressures would soon fracture or disrupt the shell. In other words, while the edges of each pair of adjacent shoes approach each other during a compression stroke due to the taper of the shell, the curved surfaces at the corners between the edges of the shoes prevent undesirable imbedding or scoring above mentioned, while permitting the maximum area of contact between the shoe and shell faces. Further, because of the curved faces opposite the angles of the friction shoes, should there be any variations between the angularity of the flat faces of the shoes and shell, the opposed curved formations of the shell and shoes facilitate the relatively rapid seating of the shoes on the shell without danger of undesirable scoring or abrasion at the corners of the shell opposite the corners of the shoes, and after the mechanism has been compressed a few times a perfect seating will be obtained, and in fact, a somewhat enlarged area of contact produced due to the merging of the curved faces into the flat faces of both the shell and shoes.

The operation of my improved friction shock absorbing mechanism, during a compression stroke, either in buff or draft, is as follows: The main follower 15 and the spring cage A will be moved inwardly toward each other, thereby forcing the wedge block F inwardly also. Due to the inward movement of the wedge block F, the friction shoes D—D and E will be wedged apart and forced into tight frictional contact with the friction shell surfaces. During the first part of the compression stroke, the friction shell will be forced inwardly in unison with the shoes, movement of both the shoes and the shell being resisted by the inner spring resistance 41 which bears on the shoes directly and the spring members 42 and 43—43, which directly cooperate with the spring follower C. Inward movement of the friction shell is finally limited by engagement with the stop shoulders 20—20 formed by the front end portions of the top and bottom walls 18—18 of the spring cage. When the friction shell is thus arrested, the friction shoes will be compelled to move inwardly of the shell during the remainder of the compression stroke. Inasmuch as the shoes directly engage the flange 39 of the spring follower C, the latter will be forced rearwardly in unison with the shoes, thus further compressing the coils 42 and 43—43 of the spring resistance, while the coil 41 is also compressed through direct engagement with said shoes. Inward movement of the friction system within the shell B is finally limited by engagement of the main follower 15 with the front end of the shell, the actuating force being thereafter transmitted through the shell and spring cage A, which form solid column means for this purpose.

During release, when the actuating force is removed, or reduced, the expansive action of the main spring resistance G will force the friction shoes and spring follower C outwardly, carrying the shell B therewith. Outward movement of the shell is finally limited by engagement of the flanges 27—27 thereof with the retaining shoulders 22—22 of the cage. After movement of the shell has been arrested in release of the mechanism, the shoes will be forced outwardly by the five coil springs of the spring resistance, which act directly on the spring follower C and by the central coil 41 of the spring resistance, which directly engages with the shoes. Outward movement of the spring follower is positively limited by engagement with the inner end of the friction shell, while movement outwardly of the shoes is limited through the retainer bolt, which limits outward movement of the wedge block.

From the preceding description taken in connection with the drawings, it will be evident that by providing the spring follower having the flange of hexagonal formation, which telescopes within the inner end of the friction shell, these two parts are locked against relative rotary displacement and inasmuch as the flange of the follower extends into the shell, in the normal position of the parts, to an extent greater than the relative movement between the friction shoes and the shell, there is no danger of the spring follower at any time becoming disengaged from the interior of the shell, thereby avoiding the danger of the shell becoming displaced laterally with respect to the spring cage during the operation of the mechanism, especially during release, when the spring follower plate portion is spaced inwardly from the inner end of the friction shell. Displacement of the shell with respect to the spring cage is further prevented by the forwardly projecting guide arms 23—23 of the cage and by the rib and groove connection provided between the flanges of the friction shell and the ribs 24 of the spring cage and the plate-like portion of the spring follower and said ribs.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage having a set of top and bottom opposed walls and a set of spaced side walls, one of said sets of opposed walls having outer retaining shoulders, and the other set of said walls having end abutment shoulders spaced inwardly from said retaining shoulders; of a hexagonal friction shell having lateral flanges engaged in back of said retaining shoulders, said shell being movable lengthwise of the cage and having its inward movement arrested by engagement with the abutment shoulders of the cage, thereby limiting the relative movement of the shell and cage to less than the full compression stroke of the mechanism; friction shoes within the shell; wedge means cooperating with the shoes, said shoes being movable with respect to the shell to a predetermined extent; a spring resistance within the cage; a spring follower interposed between the spring resistance and the inner end of the friction shell, said spring follower having an enlargement on the front face thereof telescoped within the shell to an extent exceeding the amount of relative movement of the shell and shoes, thereby holding said shell and cage against relative lateral displacement in all operative positions thereof.

2. In a friction shock absorbing mechanism, the combination with a spring cage casting; of a friction shell of regular hexagonal formation, said shell and cage being relatively movable, said cage being open at the forward end and having spaced top and bottom walls presenting transverse abutment shoulders at the forward ends thereof, spaced vertical side walls extending forwardly beyond said top and bottom walls and having transversely alined, vertically disposed retaining shoulders spaced outwardly of said abutment shoulders, said side walls having guide sections extending outwardly of the retaining shoulders and embracing said shell, said outwardly extending sections having flat interior guide faces, said shell having relatively wide, longitudinally extending, central guide ribs projecting from opposite sides thereof, said ribs having flat longitudinally disposed outer faces, said ribs being embraced by said guide sections of the side walls of the cage and said faces of the ribs slidably engaging the faces of said wall sections to guide the shell for longitudinal movement, said shell having laterally projecting, vertical retaining flanges at the inner end thereof engaged between said retaining and stop shoulders; friction means cooperating with the shell; and spring means within the cage yieldingly opposing relative movement of the shell and cage and also yieldingly opposing relative movement of the shell and friction means.

In witness that I claim the foregoing I have hereunto subscribed my name this 14th day of April 1930.

GEORGE A. JOHNSON.